March 25, 1952     T. F. GITHENS     2,590,766
METHOD OF FORMING TOOL BLANKS
Filed Jan. 22, 1949     2 SHEETS—SHEET 1
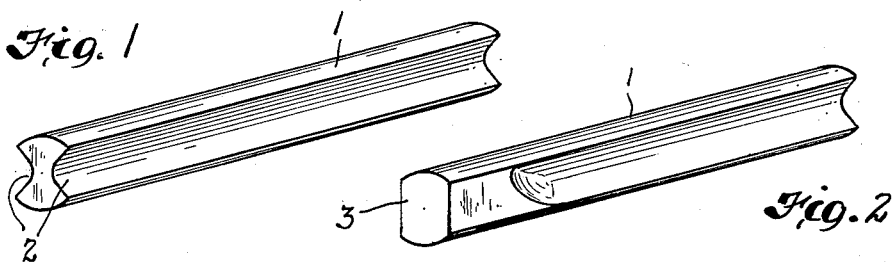
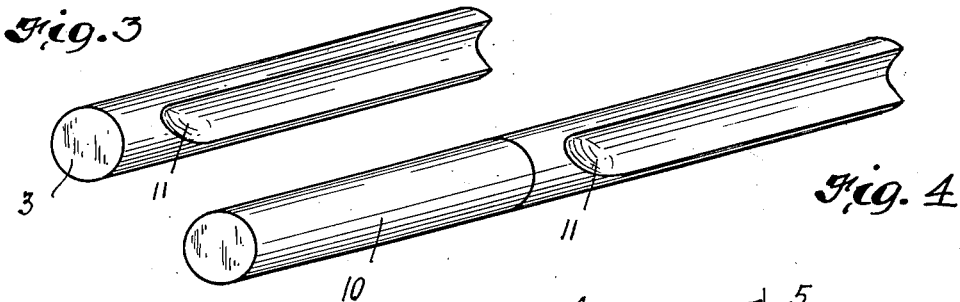
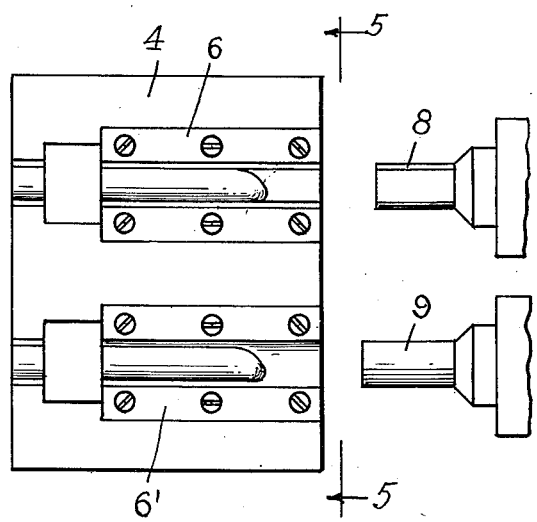
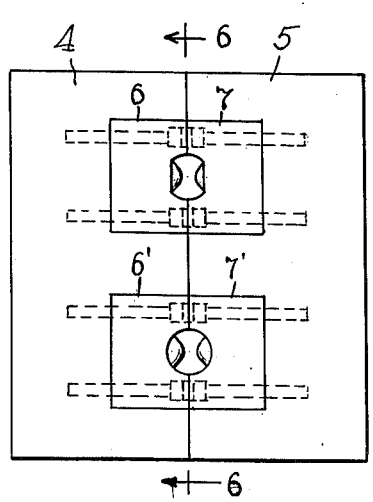
INVENTOR.
THOMAS F. GITHENS
BY
Oberlin & Limbach
ATTORNEYS

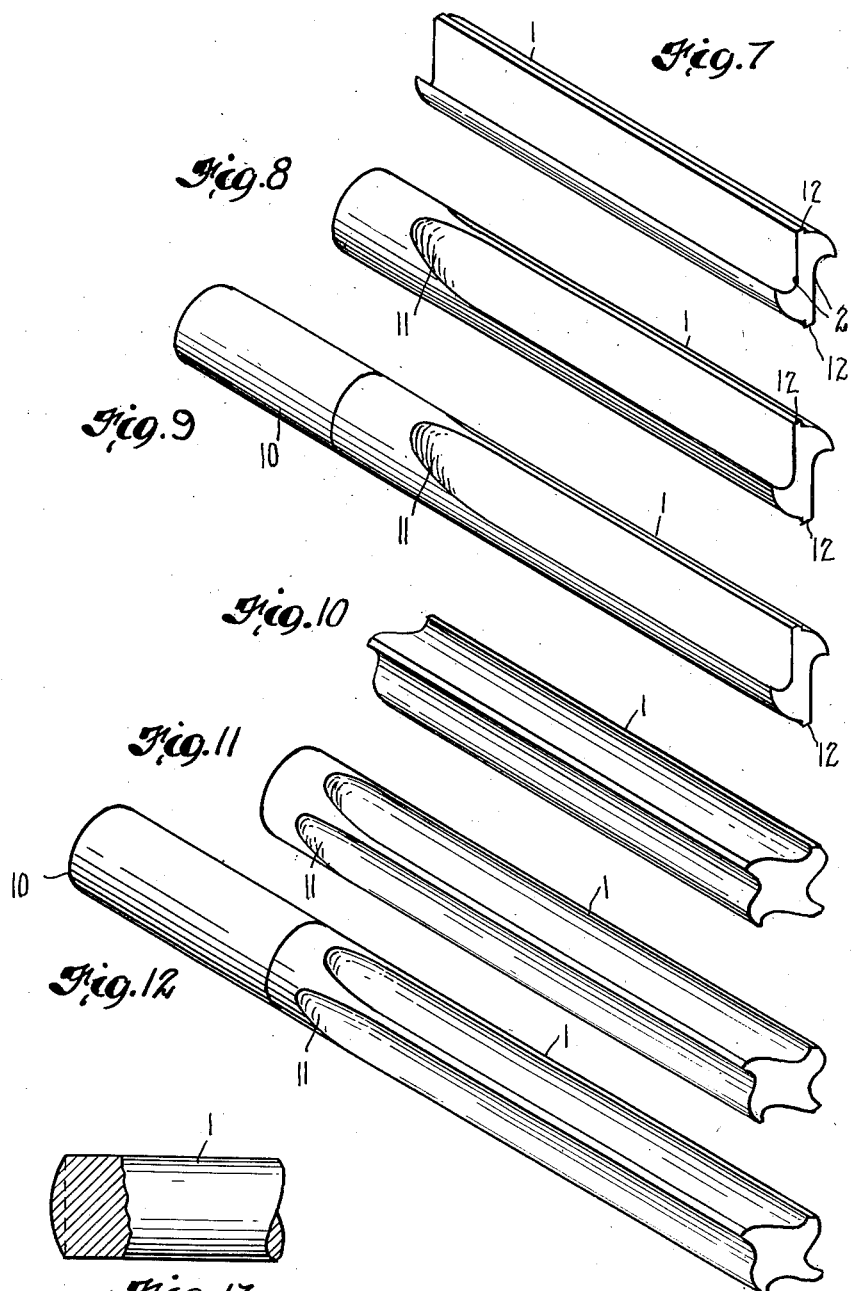

Patented Mar. 25, 1952

2,590,766

UNITED STATES PATENT OFFICE 2,590,766

METHOD OF FORMING TOOL BLANKS

Thomas F. Githens, Cleveland Heights, Ohio, assignor to The Cleveland Twist Drill Company, Cleveland, Ohio, a corporation of Ohio Application January 22, 1949, Serial No. 72,220

3 Claims. (Cl. 76—108)

This invention relates as indicated to a method of forming tool blanks. More specifically, the invention relates to a method of forming reamer blanks, twist drill blanks, and similar articles. For purposes of illustration, this description will refer specifically to the manufacture of twist drill blanks. However, it is to be understood that the method of this invention is not to be limited to this one type of tool.

Twist drills as now manufactured are made in several ways. The most common of these are to begin with a cylindrical bar and by suitable milling and machining operations, forming out of such round bar the drill body. Another method is to begin with a round bar of approximately the complete length of the drill to be made, then forging substantially straight axially extending flutes on the forward end of the blank, and then twisting such forward end into the helical shape which characterizes twist drills. There have also been proposals for rolling helical grooves directly in round bar stock to obviate the necessity for twisting any portion of the drill.

Another method is to use two grooved hot rolled stock, press fitting a sleeved shank to one end of such stock to form a secure mechanical union, and then twisting the fluted portion into drill form.

It is also customary especially when making the drill of high speed steel to form only the forward or operative portion of the drill of such expensive material and to then by a welding operation unite with such operative end a shank portion of a cheaper steel.

It is a principal object of the present invention to provide an improved method of forming twist drill blanks which is frequently more satisfactory than any heretofore previously employed and which because it lends itself particularly well to the utilization of different materials for the operative and shank portions of the drill makes possible a new method for the production of drills in which the operating portion is formed of high speed steel or similar relatively expensive materials.

Another object of this invention is to provide a more satisfactory union of the two grooved hot rolled section to the cylindrical portion of the shank than any union previously available.

Other objects will appear as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a perspective view of the starting blank used in my improved process;

Fig. 2 shows the blank in a possible, though not necessary, intermediate step in the process;

Fig. 3 shows such blank with one end thereof upset in cylindrical form;

Fig. 4 shows the completed drill blanks with the part shown in the previous figures joined in axial alignment to a cylindrical body from which the shank may be formed;

Fig. 5 is a side elevation view of a set of dies which may be used in carrying out certain steps of my improved method;

Fig. 6 is a transverse sectional view through the die blocks of Fig. 5 taken on the plane substantially indicated by the line 6—6;

Fig. 7 is a perspective view of a modified form of the starting blank used in my improved process;

Fig. 8 shows such blank with one end thereof upset in cylindrical form;

Fig. 9 shows the completed drill blank with the part shown in the previous Figs. 7 and 8 joined in axial alignment to a cylindrical body from which the shank may be formed;

Fig. 10 is a perspective view of the four fluted starting blank for a reamer;

Fig. 11 shows such four fluted reamer blank with one end thereof upset in cylindrical form;

Fig. 12 shows the completed reamer blank with the part shown in previous Figs. 10 and 11 joined in axial alignment to a cylindrical body from which the shank may be formed; and Fig. 13 shows the upset end made convex for welding.

Referring now more specifically to the drawing and more especially to Fig. 1, the bar 1 here illustrated and which forms the starting blank utilized in the first steps of my improved method and which is formed of a steel suitable for use in the operative end of twist drills is generally cylindrical in form and is provided with substantially straight longitudinally extending grooves or flutes 2. The blank of Fig. 1, shown for convenience as approximately the length needed for the manufacture of a single twist drill blank has been cut from a longer blank (not shown) of similar cross section and which longer blank has been made by a conventional rolling operation preferably with the stock in a heated condition. In other words, the starting material used in carrying out my improved method is a long bar, the length of which is many times the length of a standard twist drill and which starting bar may be made for convenience, as indicated above, by a hot rolling operation or by a variety of other ways.

Since the rolling or forging operation necessary for the production of an elongated blank of cross section illustrated in Fig. 1 is not unique but well known in the industry, an illustration and description of the mode of operation thereof is believed unnecessary for a full understanding of the present invention.

Instead of employing a rolling or forging operation to produce a blank having the cross section of Fig. 1, it is possible when using certain types of steel or other metals to form such cross section by a simple drawing operation either in one or a variety of passes through appropriate dies. However the blank is formed it will be apparent to those skilled in the art that a blank such as that illustrated in Fig. 1 can be produced at a relatively low cost and also under such conditions that the dimensions of the blank may be held within very close tolerances, usually to closer tolerances than can be economically obtained in the type of forging operations heretofore used in the manufacture of drills where it has been deemed undesirable to do the entire forming operation by a milling or grinding away of the excess metal.

After the elongated blank above described has been formed with a cross section which roughly approximates the cross section of the fluted portion of the twist drill ultimately to be formed therefrom, one end only of such blank is then upset into substantially cylindrical form. This upsetting operation which is indicated as possibly having taken place progressively by Figs. 2 and 3 in apparatus such as illustrated in Figs. 5 and 6 may be performed, however, in a variety of ways and by means of a variety of apparatuses well known to those skilled in the art, and it is preferred that the upsetting be done in one operation rather than two. In the embodiment of the invention which has been chosen for purposes of illustration, Fig. 2 shows the form of the blank at a possible intermediate stage, i. e. with the remote end 3 of the blank partially upset and in Fig. 3, fully upset into complete cylindrical form. This upsetting operation, as previously indicated, can best and usually be performed most economically in a one-stage process as, for example, by the utilization of dies such as those illustrated in Figs. 5 and 6. In said last-named figures, there are shown two separate dies held by die blocks 4 and 5, each die comprising a pair of matrix blocks 6 and 7 and 6' and 7', the first pair having a configuration such as roughly corresponds to the form of the blank shown in Fig. 2 and are not vitally necessary in the successful operation of this invention, and the second of such pair having a configuration of the form of the blank shown in Fig. 3. The upsetting operation may be performed by heating only one end of the blank to a suitable upsetting temperature, inserting such heated end into the die, and then engaging the heated end with a punch such as 8 or 9 which coincides in cross section with the cross section of the die cavity. For low alloy steels of high plasticity the upsetting operation is performed in one step, whereas for more highly alloyed steels a plurality of steps such as the two illustrated may be found necessary.

After the completion of the upsetting operation, i. e. after the production of the blank illustrated in Fig. 3, the upset cylindrical end of the blank may be made slightly convex or pointed by having the end of the punches such as 8 and 9 slightly concave or by a simple cutting or grinding operation as shown in Fig. 13, and a cylindrical extension 10 then welded thereto in axial alignment by conventional resistance welding procedure which is likewise well known to those skilled in the art.

At this point it may be noted that in forming the cylindrical upset end on the blank the matrix face of the die where the same engages the flutes of the blank may be cut away in such form that the metal will flow into a tapered termination 11 of the flute in the form generally indicated at 11, i. e. the form of flute terminus which is usually used in twist drills regardless of the precise procedure adapted for the manufacture thereof. After the blank has been formed in the manner previously indicated, it may be subjected to the conventional procedural steps commonly employed in the manufacture of twist drills. These may include a normalizing or an annealing of the blank as produced by the welding operation just described in order to relieve internal stresses which may have been set up in the body incidental to such welding. These formative steps also include a twisting of the fluted body portion of the blank shown in Fig. 4 to the desired helix angle after which the drill is finished by suitable milling and grinding operations which are so well known as not to require detailed description.

As illustrated in Figs. 7, 8 and 9, it is likewise within the contemplation of my invention to provide a blank in which one longitudinally extending edge of each flute on the original blank is provided with a ridge or land 12 usually present on most twist drills and employed for the purposes of providing "clearance" on the drill. When such additional ridge or land 12 is provided in the starting blank the only change required in the described procedure for the manufacture of the blank of Fig. 4 is either to shape the die cavity to accommodate such land or by a simple grinding operation remove such land in that area of the drill blank where the upsetting operation is performed and where the presence of such additional land on the finished drill is usually not required.

The above-described method of forming the twist drill blanks is particularly desirable for use in the manufacture of blanks in which the operative end of the drill is of high speed steel. I have successfully formed blanks such as those illustrated in Fig. 4 of steel of the molybdenum-tungsten type commercially available under the name of "Momax," i. e. a steel containing approximately 8% molybdenum and 2% tungsten with other alloying elements present for particular effects. While the process is especially useful for the manufacture of drill blanks in which the shank and operative portions are of dissimilar metals, the process can nevertheless be used in the fabrication of blanks in which the composition of both parts is substantially the same.

It is also within the contemplation of my invention, as aforementioned, to provide a blank for reamers and similar tools. The foregoing detail discussion in regard to twist drill blanks applies equally as well here, and the only variations being in the shape and size of the dies and in the different methods of processing into the various finished tools.

Other modes of applying the principle of the invention may be employed, change being made as regards the details described, provided the features stated in any of the following claims, or the equivalent of such, may be employed.

I therefore particularly point out and distinctly claim as my invention:

1. The method of forming a twist drill blank which comprises providing an elongated bar having longitudinally extending flutes and a cross-section which is roughly the same as the cross-section of the drill to be formed; severing such bar into work pieces each slightly shorter than the length of the drill to be formed; heating and upsetting one end only of each of said work pieces into cylindrical form; and welding to such upset end in end-to-end relation a substantially cylindrical bar which together with the upset end of the work piece constitutes the shank of the drill blank.

2. The method of forming a fluted tool blank which comprises providing an elongated bar having longitudinally extending flutes and a cross-section which is roughly the same as the cross-section of the fluted tool to be formed; severing such bar into work pieces each slightly shorter than the length of the tool to be formed; heating and upsetting one end only of each of said work pieces into cylindrical form; and welding to such upset end in end-to-end relation a substantially cylindrical bar which together with the upset end of the work piece constitutes the shank of the tool blank.

3. The method of forming a fluted tool blank which comprises providing an elongated bar having longitudinally extending flutes and a cross-section which is roughly the same as the cross-section of the fluted tool to be formed; severing such bar into work pieces each slightly shorter than the length of the tool to be formed; heating and upsetting one end only of each of said work pieces into cylindrical form having a slightly convex end surface; and welding to such upset and convex end in end-to-end relation a substantially cylindrical bar which together with the upset end of the work piece constitutes the shank of the tool blank.

THOMAS F. GITHENS.

REFERENCES CITED

The following references are of record in the file of this patent:

UNITED STATES PATENTS

| Number | Name | Date |
|---|---|---|
| 910,434 | Thompson | Jan. 19, 1909 |
| 985,283 | Pratt | Feb. 28, 1911 |
| 1,122,787 | Moore | Dec. 29, 1914 |
| 1,191,717 | Moore | July 18, 1916 |
| 1,379,070 | Wineman | May 24, 1921 |
| 1,403,652 | Stephens | Jan. 17, 1922 |
| 1,454,451 | Moore | May 8, 1923 |
| 1,539,374 | Smith | May 26, 1925 |
| 2,142,239 | Cook | Jan. 3, 1939 |
| 2,271,960 | Taylor | Feb. 3, 1942 |
| 2,457,132 | Delaney | Dec. 28, 1948 |

FOREIGN PATENTS

| Number | Country | Date |
|---|---|---|
| 21,558 | Great Britain | 1911 |